United States Patent
Park et al.

(10) Patent No.: US 9,479,102 B2
(45) Date of Patent: Oct. 25, 2016

(54) APPARATUS FOR DRIVING INTERIOR PERMANENT MAGNET SYNCHRONOUS MOTOR AND METHOD OF CONTROLLING THE APPARATUS

(71) Applicant: SOLUM CO., LTD., Suwon-si (KR)

(72) Inventors: Kyeoung Hun Park, Suwon-si (KR); Geun Hong Lee, Suwon-si (KR); Han Tae Kim, Suwon-si (KR)

(73) Assignee: Solum Co., Ltd., Suwon-si (KR)

( * ) Notice: Subject to any disclaimer, the term of this patent is extended or adjusted under 35 U.S.C. 154(b) by 0 days.

(21) Appl. No.: 14/664,191

(22) Filed: Mar. 20, 2015

(65) Prior Publication Data

US 2015/0295530 A1    Oct. 15, 2015

(30) Foreign Application Priority Data

Apr. 15, 2014  (KR) .......................... 10-2014-0044984
Sep. 1, 2014   (KR) .......................... 10-2014-0115526

(51) Int. Cl.
   *H02P 21/00*      (2016.01)
   *H02P 21/14*      (2016.01)

(52) U.S. Cl.
   CPC ......... *H02P 21/141* (2013.01); *H02P 21/0025* (2013.01); *H02P 21/26* (2016.02); *H02P 25/024* (2016.02); *H02P 2207/05* (2013.01)

(58) Field of Classification Search
   CPC ......................... H02P 21/141; H02P 21/0025
   USPC ..................................... 318/400.02
   See application file for complete search history.

(56) References Cited

U.S. PATENT DOCUMENTS

| | | | |
|---|---|---|---|
| 2010/0109586 A1* | 5/2010 | Matsui ................... | B60L 11/14 318/400.04 |
| 2011/0127934 A1* | 6/2011 | Suzuki .................. | B62D 5/046 318/400.02 |
| 2013/0249448 A1* | 9/2013 | Kobayashi ............ | H02P 21/141 318/400.02 |
| 2014/0333240 A1* | 11/2014 | Kobayashi .......... | H02P 29/0066 318/400.02 |
| 2015/0137720 A1* | 5/2015 | Kobayashi .......... | H02P 29/0055 318/400.15 |

FOREIGN PATENT DOCUMENTS

JP         2013-226001 A      10/2013

* cited by examiner

*Primary Examiner* — Erick Glass
(74) *Attorney, Agent, or Firm* — NSIP Law

(57) ABSTRACT

There is provided a driving apparatus of an interior permanent magnet synchronous motor (IPMSM) including a current command generator outputting a current command on a synchronous reference frame based on a command torque, wherein the current command generator generates the current command based on a variation in magnetic flux with respect to a rotor of the IPMSM.

7 Claims, 5 Drawing Sheets

FIG. 4C

| MOTOR SPEED (RPM) | TORQUE (Torque) [N m] | MAGNETIC FLUX ANGLE (β) [°] | MOTOR VOLTAGE (Motor_AVG) [V] | MOTOR CURRENT (Motor_AVG) [A] | DC-LINK VOLTAGE (DC_Voltage) [V] | INPUT CURRENT (DC_Voltage) [A] | TOTAL EFFICIENCY [%] | INVERTER EFFICIENCY [%] | MOTOR EFFICIENCY [%] | REMARKS |
|---|---|---|---|---|---|---|---|---|---|---|
| 1000 | 10 | | 19.4 | 105 | 51.3 | 31.67 | 67.7 | 91.3 | 73.7 | THE SAME AS BEFORE |
| | 10 | | | | | | | | | IMPROVED |
| | 20 | | 21.3 | 153.95 | 50.9 | 54.94 | 70.3 | 90.1 | 78.7 | THE SAME AS BEFORE |
| | 20 | | | | | | | | | IMPROVED |
| | 30 | | 22.7 | 214.84 | 50.5 | 87.88 | 69.7 | 89.3 | 77.7 | THE SAME AS BEFORE |
| | 30 | | | | | | | | | IMPROVED |
| 2000 | 10 | | 26.3 | 98.36 | 50.7 | 53.93 | 76.4 | 95.6 | 80.8 | THE SAME AS BEFORE |
| | 10 | | | | | | | | | IMPROVED |
| | 15 | | 27.5 | 125.01 | 50.3 | 76.26 | 82.2 | 95.4 | 86.8 | THE SAME AS BEFORE |
| | 15 | | | | | | | | | IMPROVED |
| | 20 | | 28.7 | 154.31 | 49.8 | 103.53 | 82.9 | 94.9 | 87.1 | THE SAME AS BEFORE |
| | 20 | | | | | | | | | IMPROVED |
| 3000 | 10 | | 29.8 | 105.54 | 48.4 | 81.65 | 83.2 | 96.3 | 86.7 | THE SAME AS BEFORE |
| | 10 | | | | | | | | | IMPROVED |
| | 15 | | 31.5 | 138.58 | 47.8 | 123.84 | 84.1 | 96.1 | 87.5 | THE SAME AS BEFORE |
| | 15 | | | | | | | | | IMPROVED |
| | 20 | | 33.2 | 167.36 | 47.1 | 166.33 | 85 | 96.1 | 88.4 | THE SAME AS BEFORE |
| | 20 | | | | | | | | | IMPROVED |
| 5000 | 3 | | 35.5 | 73.54 | 52.4 | 42.66 | 65.6 | 95.2 | 72.4 | THE SAME AS BEFORE |
| | 3 | | | | | | | | | IMPROVED |
| | 5 | | 34.5 | 104.98 | 52 | 73.08 | 74.3 | 94.7 | 79.6 | THE SAME AS BEFORE |
| | 5 | | | | | | | | | IMPROVED |
| | 7.7 | | 33.2 | 131.63 | 49.3 | 110.17 | 79.4 | 93.9 | 84.6 | THE SAME AS BEFORE |
| | 7.7 | | | | | | | | | IMPROVED |

APPARATUS FOR DRIVING INTERIOR PERMANENT MAGNET SYNCHRONOUS MOTOR AND METHOD OF CONTROLLING THE APPARATUS

CROSS-REFERENCE TO RELATED APPLICATION

This application claims the benefit of Korean Patent Application No. 10-2014-0115526, filed on Sep. 1, 2014, entitled "Apparatus for Driving Interior Permanent Magnet Synchronous Motor and Method of Controlling the Apparatus", Korean Patent Application No. 10-2014-0044984, filed on Apr. 15, 2014, entitled "Controlling System for Interior Permanent Magnet Synchronous Motor and Controlling Method thereof" which are hereby incorporated by reference in its entirety into this application.

BACKGROUND

The present disclosure relates to an apparatus for driving an interior permanent magnet synchronous motor (IPMSM) and a method of controlling the apparatus.

An IPMSM that is driven using an inverter is mainly applied as a traction electric motor of electric vehicles or hybrid vehicles. In this kind of application field, an IPMSM is driven in a torque control mode, and a vector control in which a magnetic flux current and a torque current are independently controlled is performed.

Also, a range of a driving speed of a rotor of the IPMSM used in electric vehicles or hybrid vehicles is very broad, and thus the range frequently includes up to a flux-weakening control 2 range among driving ranges. The flux-weakening control 2 range exists only when center of a voltage limit ellipse of an IPMSM is within a current limit circle.

In general, in the flux-weakening control 2 range, only a voltage limit condition functions as a driving limit condition of the IPMSM, and an amount of a DC-link voltage of an inverter is limited, and thus, it is advantageous to use the voltage limit condition as much as possible in terms of output torque.

RELATED ART DOCUMENT

Patent Document (Patent Document 1) JP 2013-226001

SUMMARY

An aspect of the present disclosure may provide an apparatus for driving an interior permanent magnet synchronous motor (IPMSM) and a method of controlling the apparatus for driving the IPMSM, in which the problem that, when generating a current command of a synchronous reference frame for driving the IPMSM, great variation in final output torque is caused even by a current variation of a d-axis and a q-axis which is small in a high speed range due to the dependency of a two-dimensional lookup table according to the related art, on a DC-link voltage and a rotor speed, may be prevented.

According to an aspect of the present disclosure, an apparatus for driving an IPMSM may generate a current command on a synchronous reference frame for driving the IPMSM based on a command torque $T_e$ input from a user, based on a magnetic flux plane $\lambda$ which is stable with respect to high speed characteristics of the IPMSM and variation in parameters or the like.

That is, the current command generator may use a lookup table generated based on a magnetic flux plane $\lambda$ when generating current commands $I_{ds}^r$ and $I_{qs}^r$ of a d-axis and a q-axis on a synchronous reference frame corresponding to the command torque $T_e$ from a user.

Here, the lookup table may store an angle (magnetic flux angle) $\beta$ between a d-axis magnetic flux $\lambda_d$ and a q-axis magnetic flux $\lambda_q$ on the synchronous reference frame (d-axis, q-axis) corresponding to the maximum magnetic flux value $\lambda_{max}$ of the IPMSM and the command torque $T_e$.

BRIEF DESCRIPTION OF DRAWINGS

The above and other aspects, features and other advantages of the present disclosure will be more clearly understood from the following detailed description taken in conjunction with the accompanying drawings, in which:

FIG. 4C is a table showing variation in the efficiencies of FIGS. 4A and 4B.

DETAILED DESCRIPTION

Figure 1:
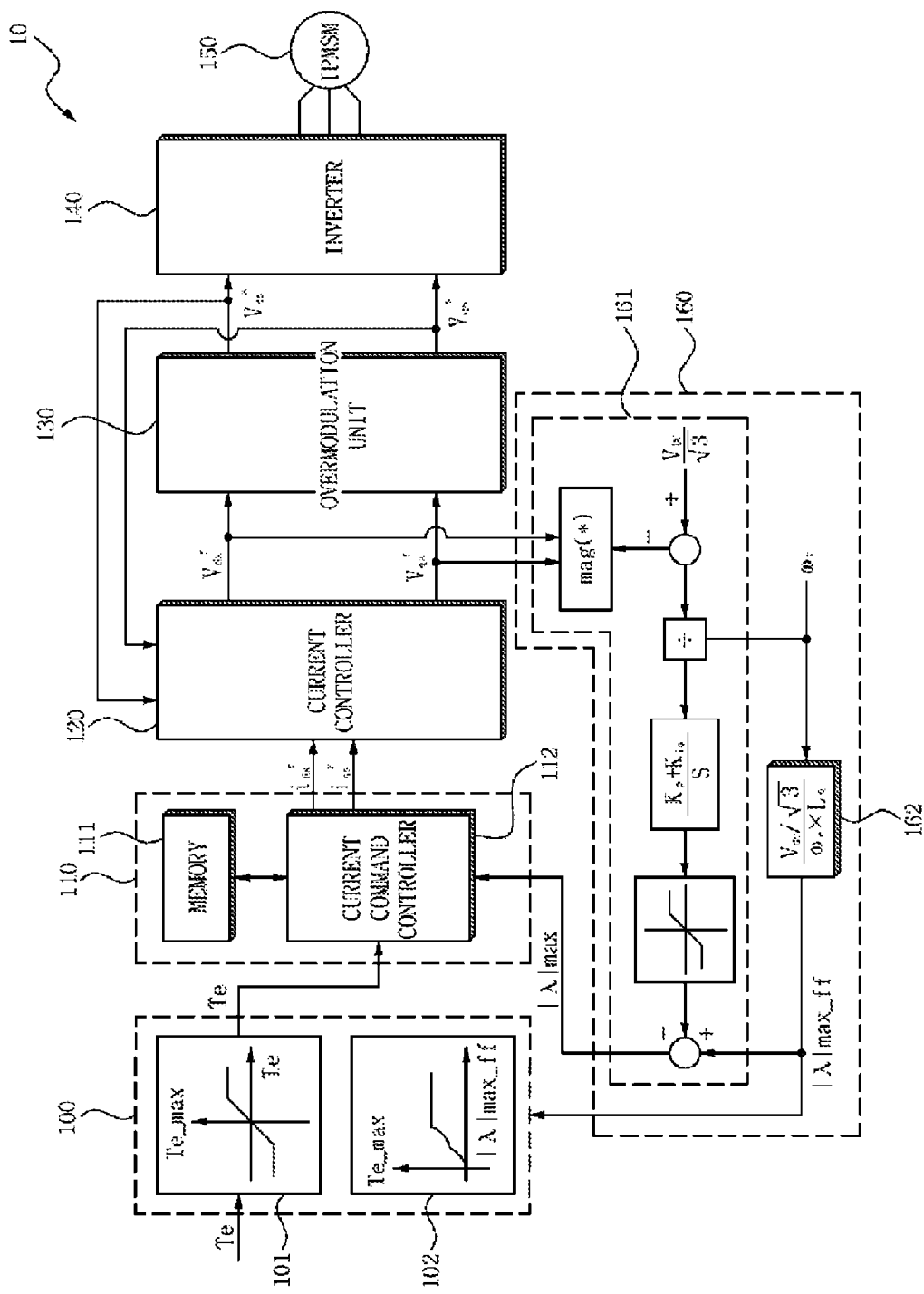
FIG. 1 is a block diagram illustrating an apparatus for driving an interior permanent magnet synchronous motor (IPMSM) according to an exemplary embodiment of the present disclosure.

The objects, features and advantages of the present disclosure will be more clearly understood from the following detailed description of the exemplary embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present disclosure, when it is determined that the detailed description of the related art would obscure the gist of the present disclosure, the description thereof will be omitted.

Hereinafter, exemplary embodiments of the present disclosure will be described in detail with reference to the accompanying drawings.

Hereinafter, an apparatus for driving an interior permanent magnet synchronous motor (IPMSM) and a method of controlling the apparatus for driving the IPMSM according to the present disclosure will be described in detail with reference to the attached drawings. A superscript 'r' denotes a variable of a synchronous reference frame, and a subscript 's' denotes a variable of a stationary reference frame.

FIG. 1 is a block diagram illustrating an apparatus for driving an IPMSM according to an exemplary embodiment of the present disclosure. The apparatus for driving an IPMSM according to the exemplary embodiment of the present disclosure may include a command torque controller 100, a current command generator 110, a current controller 120, an overmodulation unit 130, a rotor position detector (not shown), and an inverter 140.

Here, an IPMSM 150 performs maximum torque per voltage (MTPV) per unit voltage, whereby a maximum torque may be output with respect to an available voltage, and under such a condition, a movement operation of a current command exhibits a nonlinear relationship as inductance of the IPMSM 150 is saturated according to an amount of a current.

The current command generator 110 outputs current commands $I_{ds}^r$ and $I_{qs}^r$ on the synchronous reference frame based on a command torque $T_e$ transmitted from an upper controller (not shown) and variation in magnetic flux with respect to a rotor (not shown) of the IPMSM 150.

That is, a d-axis magnetic flux $\lambda_{ds}^r$ and a q-axis magnetic flux $\lambda_{qs}^r$ on the synchronous reference frame (d-axis, q-axis) are calculated based on a DC-link voltage $V_{dc}$ of the inverter 140, a maximum magnetic flux $\lambda_{max}$ calculated based on a speed $W_r$ of the rotor (not shown) of the IPMSM 150, and the command torque $T_e$. Also, by using the d-axis magnetic flux $\lambda_d$, and the q-axis magnetic flux $\lambda_q$, a d-axis current command $I_{ds}^r$ and a q-axis current command $I_{qs}^r$ on the synchronous reference frame are generated.

Also, the current command generator 110 includes a memory 111, a current command controller 112, and a magnetic flux detector 160. The memory 111 includes a lookup table in which an angle (magnetic flux angle) β between the d-axis magnetic flux $\lambda_d$ and the q-axis magnetic flux $\lambda_q$ on the synchronous reference frame (d-axis, q-axis) corresponding to the maximum magnetic flux $\lambda_{max}$ and the command torque $T_e$ is stored.

Here, the lookup table is generated by measuring an angle (magnetic flux angle) between the d-axis magnetic flux $\lambda_d$ and the q-axis magnetic flux $\lambda_q$ on the synchronous reference frame (d-axis, q-axis) corresponding to the maximum magnetic flux $\lambda_{max}$ and the command torque, in advance, with respect to all driving ranges of an IPMSM.

The magnetic flux detector 160 calculates a maximum magnetic flux value $\lambda_{max}$ based on a DC-link voltage $V_{dc}$ applied to the inverter 140 and an angular speed $W_r$ of the rotor (not shown) of the IPMSM 150, and performs flux-weakening control by adjusting a magnetic flux of the IPMSM 150.

That is, the magnetic flux detector 160 calculates the maximum magnetic flux value $\lambda_{max}$ of the IPMSM 150 by using an upper limit magnetic flux value λ_max_ff of the IPMSM 150 calculated based on the angular speed $W_r$ of the rotor of the IPMSM and a maximum magnetic flux compensation value calculated based on a d-axis voltage $V_{ds}^r$ and a q-axis voltage $V_{qs}^r$ on the synchronous reference frame corresponding to the d-axis current command $I_{ds}^r$ and the q-axis current command $I_{qs}^r$, and transmits the maximum magnetic flux value $\lambda_{max}$ to the current command generator 110.

In more detail, the magnetic flux detector 160 includes an upper limit magnetic flux value generator 162 calculating an upper limit magnetic flux value λ_max_ff by using an angular speed $W_r$ of the rotor (not shown) of the IPMSM and a maximum synthesis voltage ($V_{OUT}=V_{dc}/\sqrt{3}$) to be applied to the IPMSM 150, and a magnetic flux controller 161 calculating a maximum magnetic flux value $\lambda_{max}$ of the IPMSM by using a maximum magnetic flux compensation value of the IPMSM calculated based on a square average of the d-axis voltage $V_{ds}^r$ and the q-axis voltage $V_{qs}^r$ output from the current controller 120 and the maximum synthesis voltage of the inverter 140.

The upper limit magnetic flux value generator 162 generates an upper limit magnetic flux value λ_max_ff that is inversely proportional to the angular speed $W_r$ of the rotor of the IPMSM 150 as shown in [Equation 1] below, and transmits the upper limit magnetic flux value λ_max_ff to the command torque controller 100 and the magnetic flux controller 161.

The magnetic flux controller 161 subtracts from a maximum voltage value (Equation 2) that may be synthesized in the inverter 140 the square average (Equation 3) of the d-axis and q-axis voltages $V_{ds}^r$ and $V_{qs}^r$ on the synchronous reference frame output from the current controller 120.

$$\text{Upper limit magnetic flux value }(\lambda\_max\_\mathit{ff})=(V_{dc}/\sqrt{3})/(W_r L_q), \quad \text{[Equation 1]}$$

where $L_q$ denotes inductance of a q-axis stator of the IPMSM 150.

$$\text{Maximum voltage value}(V_{OUT}) = \frac{V_{DC}}{\sqrt{3}} \quad \text{[Equation 2]}$$

$$\text{Square average }(mag(*))=\sqrt{(V_{ds}^r)^2+(V_{qs}^r)^2} \quad \text{[Equation 3]}$$

Furthermore, a maximum magnetic flux deduction value is calculated by dividing a value obtained by subtracting the square average (Equation 3) from the maximum voltage value (Equation 2), by the angular speed $W_r$ of the rotor of the IPMSM 150, and via proportional integration control.

Here, the maximum magnetic flux deduction value is controlled not to exceed a predetermined upper limit, and a transfer function of the proportional integration control may be defined as in Equation 4.

$$T(s)=(Ki+Kp*s)/s \quad \text{[Equation 4]}$$

(Ki denotes an integral constant, Kp denotes a proportional constant, s denotes a Laplace operator.)

Also, the magnetic flux controller 161 calculates a maximum magnetic flux value $\lambda_{max}$ of the IPMSM 150 corresponding to a value obtained by subtracting the maximum magnetic flux deduction value from the upper limit magnetic flux value λ_max_ff transmitted from the upper limit magnetic flux value generator 162 and transmits the maximum magnetic flux value $\lambda_{max}$ to the current command generator 110.

The current command controller 112 receives from the memory 111 an angle (magnetic flux angle) β between the d-axis magnetic flux and the q-axis magnetic flux on the synchronous reference frame (d-axis, q-axis) corresponding to the command torque $T_e$ and the maximum magnetic flux $\lambda_{max}$ transmitted from the magnetic flux controller 161, so as to output current commands $I_{ds}^r$ and $I_{qs}^r$ of the d-axis and the q-axis.

The current controller 120 may output a d-axis voltage and a q-axis voltage $V_{ds}^r$ and $V_{qs}^r$ on the synchronous reference frame based on the current commands $I_{ds}^r$ and $I_{qs}^r$ of the d-axis and the q-axis transmitted from the current command controller 112, and may be a proportional and integral controller.

The overmodulation unit 130 converts an output voltage of the current controller 120 to a voltage on a stationary reference frame by using, for example, position information of the rotor (not shown) received from the rotor position detector, and generates a pulse width modulation (PWM) signal to control a switching operation of the inverter 140.

The command torque controller 100 controls the command torque $T_e$ from the user not to exceed an upper limit torque $T_{e\_max}$ calculated based on the upper limit magnetic flux value $\lambda\_max\_ff$ transmitted from the upper limit magnetic flux value generator 162.

That is, the command torque controller 100 generates an upper limit torque $T_{e\_max}$ corresponding to the upper limit magnetic flux value $\lambda\_max\_ff$ transmitted from the upper limit magnetic flux value generator 162, and controls the command torque $T_e$ not to exceed the upper limit torque $T_{e\_max}$.

Hereinafter, an apparatus for driving an IPMSM and a method of controlling the apparatus for driving, according to the present disclosure will be described in detail with reference to FIGS. 2A through 4C.

Figure 2A:
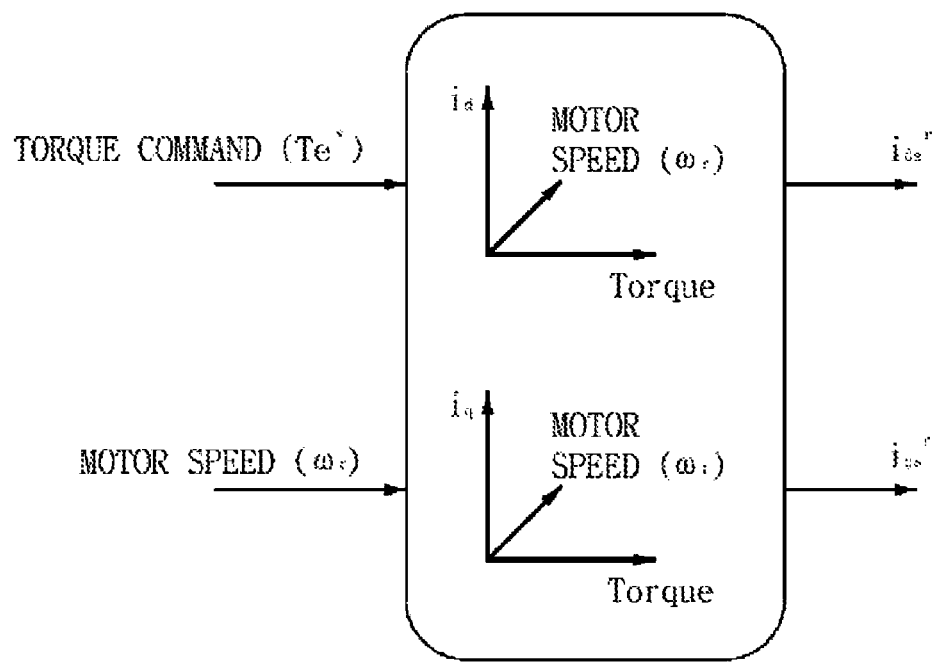
FIG. 2A illustrates a two-dimensional lookup table according to the related art.
Figure 2B:
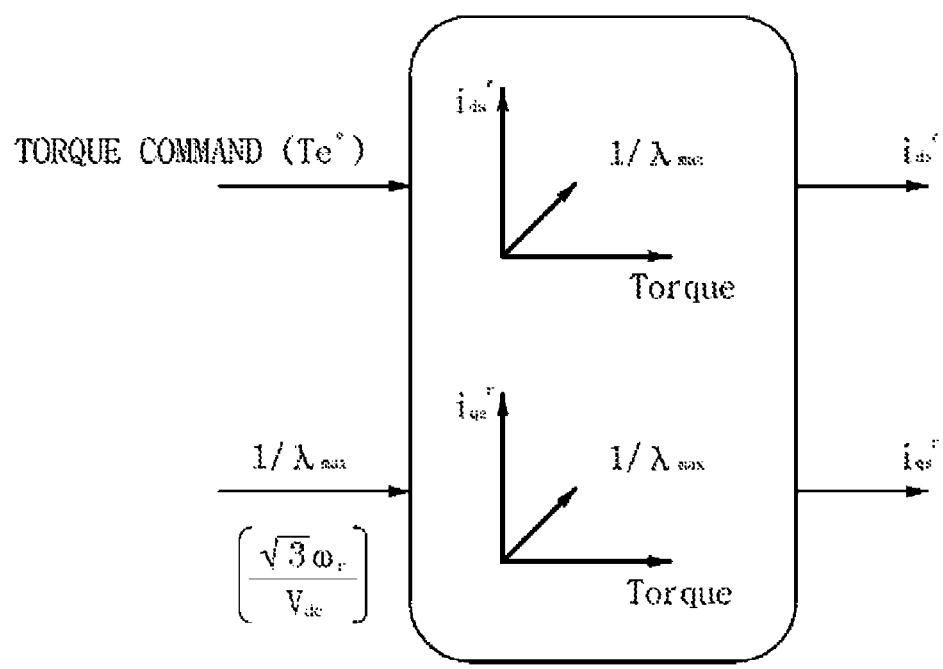
FIG. 2B illustrates a two-dimensional lookup table according to the present disclosure.
Figure 3:
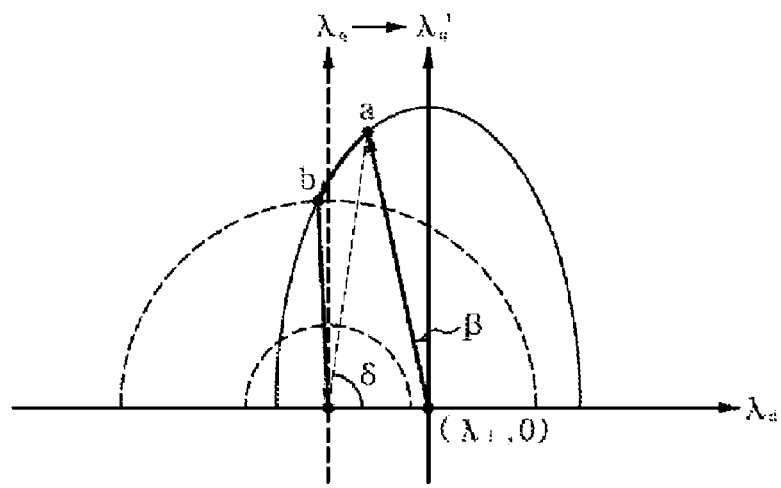
FIG. 3 illustrates a variation in magnetic flux of a d-axis and a q-axis on a synchronous reference frame according to a motor speed according to an exemplary embodiment of the present disclosure.

FIG. 2A illustrates a two-dimensional lookup table according to the related art, and FIG. 2B illustrates a two-dimensional lookup table according to the present disclosure; FIG. 3 illustrates a variation in magnetic flux of a d-axis and a q-axis on a synchronous reference frame according to a motor speed according to an exemplary embodiment of the present disclosure.

Figure 4A:
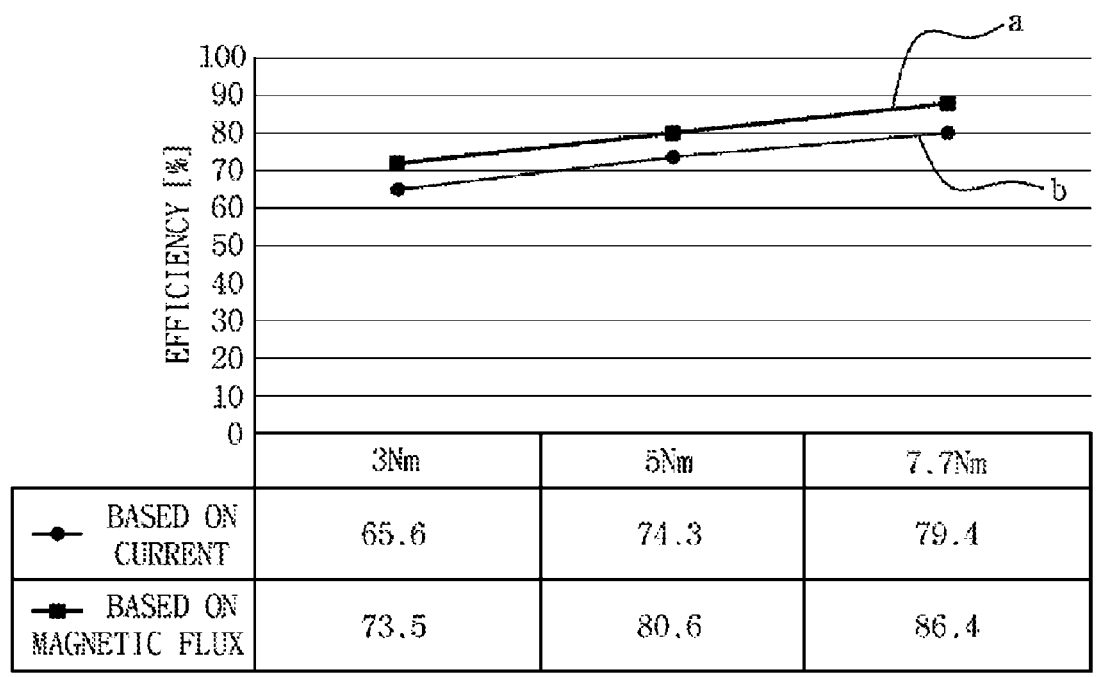
FIG. 4A is a graph showing a variation in an efficiency of an IPMSM driving circuit regarding a command torque according to an exemplary embodiment of the present disclosure.
Figure 4B:
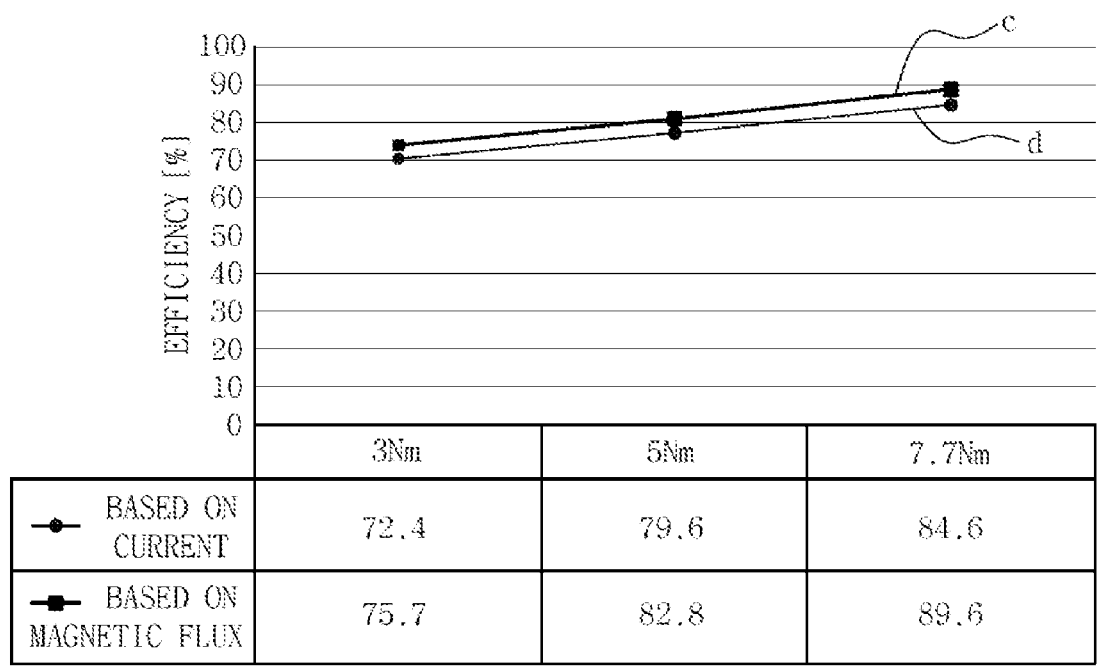
FIG. 4B is a graph showing a variation in an efficiency of an IPMSM regarding a command torque according to an exemplary embodiment of the present disclosure.

FIG. 4A is a graph showing a variation in an efficiency of an IPMSM driving circuit regarding a command torque according to an exemplary embodiment of the present disclosure; FIG. 4B is a graph showing a variation in an efficiency of an IPMSM regarding a command torque according to an exemplary embodiment of the present disclosure; FIG. 4C is a table showing variation in the efficiencies of FIGS. 4A and 4B.

As illustrated in FIG. 2A, according to the related art, a current command of the synchronous reference frame corresponding to a command torque is generated by using a current command generator by referring to a two-dimensional lookup table (reference table) according to a DC-link voltage $V_{dc}$ applied to an inverter and an angular speed $W_r$ of a rotor. However, the current command generator based on a current plane as described above has the problem that variation in output torque increases even at a small variation of current of a d-axis and a q-axis on a synchronous reference frame in a high speed range.

As illustrated in FIG. 2B, according to the apparatus for driving the IPMSM according to an exemplary embodiment of the present disclosure, the current command generator 110 generates a current command on a synchronous reference frame, which is to be used in driving the IPMSM 150 based on a command torque input by the user, based on magnetic flux plane $\lambda$ which is stable with respect to high speed characteristics of the IPMSM 150 and variation in parameters or the like.

That is, the current command generator 110 uses a lookup table generated based on a magnetic flux plane $\lambda$ when generating current commands $I_{ds}^r$ and $I_{qs}^r$ of a d-axis and a q-axis on a synchronous reference frame corresponding to a command torque $T_e$ from the user.

Here, the lookup table stores an angle (magnetic flux angle) $\beta$ between a d-axis magnetic flux $\lambda_d$ and a q-axis magnetic flux $\lambda_q$ on a synchronous reference frame (d-axis, q-axis) corresponding to the maximum magnetic flux value $\lambda_{max}$ of the IPMSM 150 and the command torque $T_e$.

In more detail, as illustrated in FIG. 3, the lookup table includes an angle (magnetic flux angle) $\beta$ between a d-axis magnetic flux and a q-axis magnetic flux on a synchronous reference frame (d-axis, q-axis) corresponding to the maximum magnetic flux value $\lambda_{max}$ of the IPMSM 150, in which a present DC-link voltage $V_{dc}$ applied to the inverter 140 and the angular speed $W_r$ of the rotor of the IPMSM 150 are reflected, and the command torque $T_e$.

Here, the magnetic flux angle $\beta$ is based on a magnetic flux plane where the q-axis magnetic flux is shifted from $\lambda_q$ to $\lambda_q'$ in order to remove the influence of a magnetic flux interlinkage $\lambda_f$ due to a permanent magnet, with respect to the d-axis magnetic flux $\lambda_d$ on the synchronous reference frame.

Also, as illustrated in FIG. 3, when an amount of magnetic flux at a point (a) is $|\lambda_s|$, a d-axis magnetic flux $\lambda_{ds}^r$ and a q-axis magnetic flux $\lambda_{qs}^r$ on the synchronous reference frame may be expressed as in [Equation 6] below. Here, $|\lambda_s|$ is determined based on the present DC-link voltage $V_{dc}$ and the angular speed $W_r$ d of the rotor (not shown).

$$\lambda_{ds}^r = \lambda_f - |\lambda_s|\sin\beta$$

$$\lambda_{qs}^r = |\lambda_s|\cos\beta \qquad \text{[Equation 6]}$$

Also, amounts $|\lambda_s|$ of the d-axis magnetic flux $\lambda_{ds}^r$ and the q-axis magnetic flux $\lambda_{qs}^r$ on the synchronous reference frame may be formed in a range in which they are smaller than the maximum synthesis voltage of the inverter 140 as expressed in [Equation 7] below.

$$|\lambda_s| = \sqrt{\lambda_{ds}^2 + \lambda_{qs}^2} \leq \frac{V_{ds}}{\sqrt{3}\omega r} \qquad \text{[Equation 7]}$$

Furthermore, as illustrated in FIG. 3, when amounts of the d-axis magnetic flux and the q-axis magnetic flux at a point (a) is $|\lambda_s|$, a d-axis current command $I_{ds}^r$ and a q-axis current command $I_{qs}^r$ on a synchronous reference frame with respect to a present command torque may be calculated based on [Equation 5] to [Equation 7] above and [Equation 8] and [Equation 9] below.

$$\lambda_{ds}^r = L_{ds}i_{ds}^r + \lambda_f \rightarrow i_{ds}^r = \frac{(\lambda_{ds}^r - \lambda_f)}{L_{ds}} \qquad \text{[Equation 8]}$$

$$\lambda_{qs}^r = L_{qs}i_{qs}^r + \lambda_f \rightarrow i_{qs}^r = \frac{(\lambda_{qs}^r)}{L_{qs}} \qquad \text{[Equation 9]}$$

As described above, as the apparatus for driving an IPMSM according to an exemplary embodiment of the present disclosure calculates a current command with respect to the command torque $T_e$ based on the magnetic flux plane $\lambda$, 1) the total efficiency of the apparatus for driving is increased (graph a) at a predetermined motor speed (about 5000 rpm) with respect to the command torque compared to the related art (graph b) as shown in FIG. 4A, and 2) an efficiency of the motor at a predetermined motor speed (about 5000 rpm) with respect to the command torque is increased (graph c) compared to the related art as shown in FIG. 4B.

Also, a maximum torque may be generated at a wide speed range of the IPMSM, and various speed estimation capabilities at excessive characteristics may be provided, and rigidity against variation in n parameters such as load and inertia may be provided. In addition, an optimum operating point, at which the maximum torque may be generated, may be acquired from a predetermined torque region to a predetermined output region.

Furthermore, the method of controlling the apparatus for driving the IPMSM 150 according to an exemplary embodiment of the present invention may include: receiving the command torque and outputting a current command on a synchronous reference frame based on the command torque and a variation in magnetic flux with respect to a rotor of the IPMSM.

The outputting of a current command on the synchronous reference frame includes: 1) calculating, by using the magnetic flux detector 160, the maximum magnetic flux value $\lambda_{max}$ based on the DC-link voltage of the inverter 140 and a speed of the rotor of the IPMSM; 2) receiving, by using the current command controller 112, the command torque, and the maximum magnetic flux value $\lambda_{max}$ from the magnetic flux detector 160; 3) receiving, by using the current command controller 112, from the memory 111 an angle (magnetic flux angle) between a d-axis magnetic flux and a q-axis magnetic flux on the synchronous reference frame (d-axis, q-axis) corresponding to the command torque and the maximum magnetic flux value $\lambda_{max}$; and 4) outputting, by using the current command controller 112, a current command of the d-axis and the q-axis on the synchronous reference frame by using the angle (magnetic flux angle) between the d-axis magnetic flux and the q-axis magnetic flux.

Here, the calculating of the maximum magnetic flux value $\lambda_{max}$ includes: 1) calculating, by using the upper limit magnetic flux value generator 162, an upper limit magnetic flux value $\lambda\_max\_ff$ by using the angular speed of the rotor of the IPMSM and a maximum synthesis voltage to be applied to the IPMSM; and 2) calculating, by using the magnetic flux controller 161, the maximum magnetic flux value $\lambda_{max}$ of the IPMSM by using a maximum magnetic flux compensation value of the IPMSM calculated by using a square average of the d-axis voltage and the q-axis voltage output from the current controller 120 and the maximum synthesis voltage of the inverter.

Furthermore, the method further includes: outputting, by using the current controller 120, a d-axis voltage and a q-axis voltage on the synchronous reference frame based on the current commands of the d-axis and the q-axis transmitted from the current command controller 112; converting, by using the overmodulation unit 130, the d-axis voltage and the q-axis voltage on the synchronous reference frame, output from the current controller 120, to a d-axis voltage and a q-axis voltage on a stationary reference frame; and generating, by using the overmodulation unit 130, a PWM signal for controlling the inverter based on the d-axis voltage and a q-axis voltage on the stationary reference frame.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the disclosure.

Accordingly, any and all modifications, variations or equivalent arrangements should be considered to be within the scope of the disclosure, and the detailed scope of the disclosure will be disclosed by the accompanying claims.

What is claimed is:

1. An apparatus for driving an interior permanent magnet synchronous motor (IPMSM), comprising:
    a current command generator configured to
        output a current command on a synchronous reference frame based on a command torque, and
        generate the current command based on a variation in magnetic flux with respect to a rotor of the IPMSM, by calculating a d-axis magnetic flux and d-axis magnetic flux on the synchronous reference frame based on a maximum magnetic flux value of the IPMSM and the command torque, and by generating a d-axis current command and a q-axis current command on the synchronous reference frame by using the d-axis magnetic flux and the q-axis magnetic flux; and
    a magnetic flux detector configured to
        calculate the maximum magnetic flux value by using a maximum magnetic flux compensation value calculated based on an upper limit magnetic flux value calculated based on an angular speed of the rotor, a d-axis voltage command on the synchronous reference frame corresponding to the d-axis current command, and a q-axis voltage command on the synchronous reference frame corresponding to the q-axis current command, and
        transmit the maximum magnetic flux value to the current command generator.

2. The apparatus of claim 1, wherein the current command generator includes:
    a memory including a lookup table in which an angle between the d-axis magnetic flux and the q-axis magnetic flux on the synchronous reference frame corresponding to the maximum magnetic flux value and the command torque is stored; and
    a current command controller configured to receive from the memory the angle between the d-axis magnetic flux and the q-axis magnetic flux on the synchronous reference frame corresponding to the command torque and the maximum magnetic flux value transmitted from the magnetic flux detector, to generate and output the d-axis an q-axis current commands.

3. The apparatus of claim 2, further comprising;
    a current controller configured to output a d-axis voltage and a q-axis voltage on the synchronous reference frame based on the d-axis and q-axis current commands transmitted from the current command controller;
    an overmodulation unit configured to convert the d-axis voltage and the q-axis voltage on the synchronous reference frame output from the current controller to a d-axis voltage and a q-axis voltage on a stationary reference frame, and configured to generate a pulse width modulation (PWM) signal to control an inverter based on the d-axis voltage and the q-axis voltage on the stationary reference frame;
    a rotor position detector configured to detect a position and the speed of the rotor; and
    a command torque controller configured to control the command torque not to exceed an upper limit torque calculated based on the upper limit magnetic flux value transmitted from the magnetic flux detector.

4. The apparatus of claim 3, wherein the magnetic flux detector includes:
    an upper limit magnetic flux value generator configured to calculate the upper limit magnetic flux value by using the angular speed of the rotor of the IPMSM and a maximum synthesis voltage to be applied to the IPMSM; and
    a magnetic flux controller configured to calculate the maximum magnetic flux value by using the maximum magnetic flux compensation value calculated based on a square average of the d-axis voltage and the q-axis voltage output from the current controller and the maximum synthesis voltage of the inverter.

5. A method of controlling a driving apparatus of an interior permanent magnet synchronous motor (IPMSM) including a current command generator outputting a current command on a synchronous reference frame based on a command torque, the method comprising:

receiving the command torque; and outputting the current command on the synchronous reference frame based on the command torque and a variation in magnetic flux with respect to a rotor of the IPMSM, wherein the outputting of the current command on the synchronous reference frame comprises calculating, by a magnetic flux detector, a maximum magnetic flux value based on a DC-link voltage of an inverter and an angular speed of the rotor, receiving, by the current command controller, the command torque and the maximum magnetic flux value from the magnetic flux detector, receiving, the current command controller, from a memory and angle between a d-axis magnetic flux and a q-axis magnetic flux on the synchronous reference frame corresponding to the command torque and the maximum magnetic flux value, and outputting, by the current command controller, a d-axis current command and a q-axis current command on the synchronous reference frame by using the angle between the d-axis magnetic flux and the q-axis magnetic flux, and wherein the calculating of the maximum magnetic flux value comprise calculating, by an upper limit magnetic flux value generator, and upper limit magnetic flux value by using the angular speed of the rotor and a maximum synthesis voltage to be applied to the IPMSM; and calculating, by a magnetic flux controller, the maximum magnetic flux value of the IPMSM by using the maximum magnetic flux compensation value of the IPMSM calculated based on a square average of the d-axis voltage and the q-axis voltage output from the current controller and the maximum synthesis voltage of the inverter.

6. The method of claim 5, further comprising:

outputting, by a current controller, a d-axis voltage and a q-axis voltage on the synchronous reference frame based on the d-axis and q-axis current commands transmitted from the current command controller;

converting, by an overmodulation unit, the d-axis voltage and the q-axis voltage on the synchronous reference frame, output from the current controller, to a d-axis voltage and a q-axis voltage on a stationary reference frame; and generating, by the overmodulation unit, a pulse width modulation (PWM) signal for controlling the inverter based on the d-axis voltage and the q-axis voltage on the stationary reference frame.

7. The method of claim 6, further comprising detecting, by a rotor position detector, a position and the speed of the rotor of the IPMSM.

* * * * *